Aug. 15, 1950 W. H. BACH 2,518,743
PHOTOGRAPHIC SOUND RECORDING SYSTEM
Filed Jan. 12, 1946 2 Sheets-Sheet 1
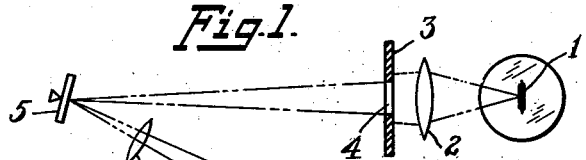
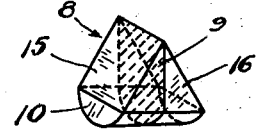
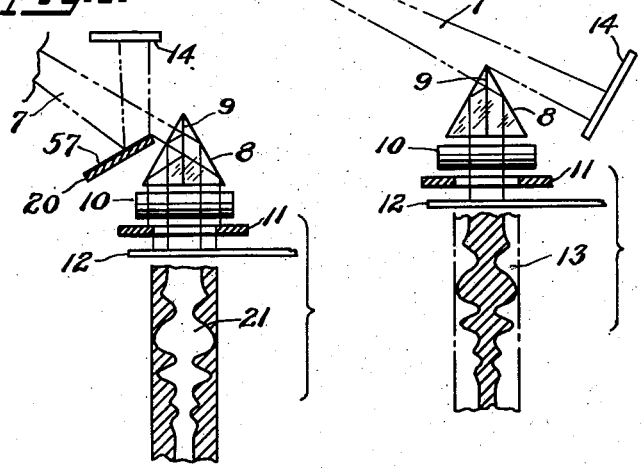
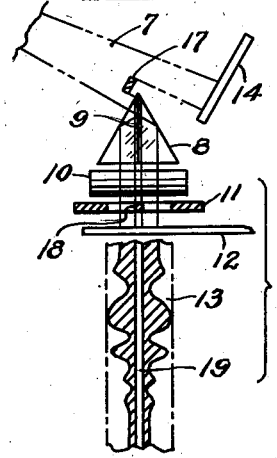
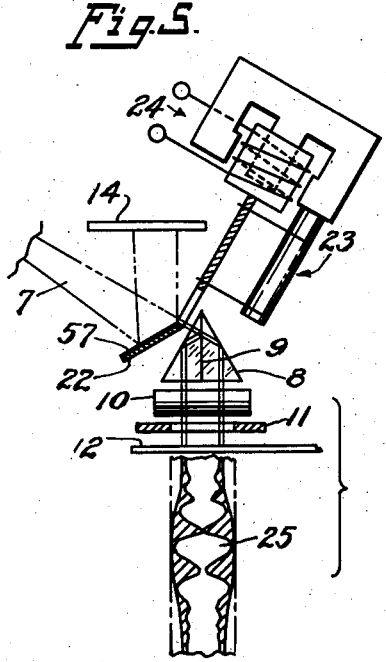
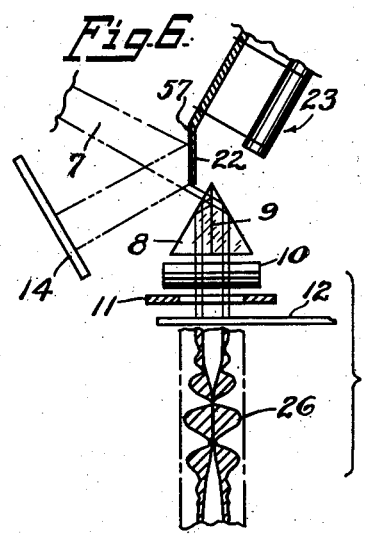
INVENTOR
Walter H. Bach
BY Robt. W. Pearson
ATTORNEY

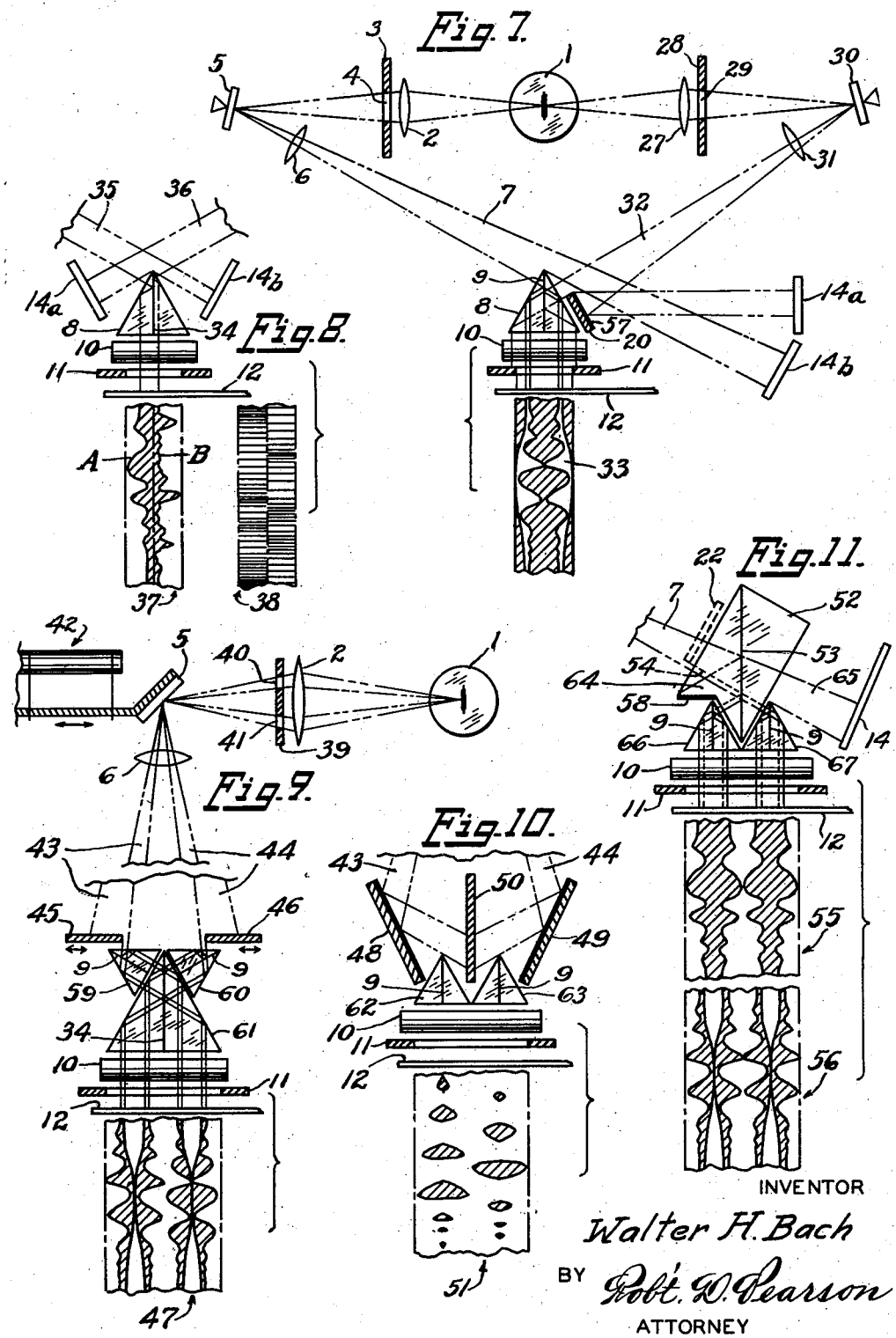

Patented Aug. 15, 1950

2,518,743

UNITED STATES PATENT OFFICE 2,518,743

PHOTOGRAPHIC SOUND RECORDING SYSTEM

Walter H. Bach, Hollywood, Calif.

Application January 12, 1946, Serial No. 640,736

17 Claims. (Cl. 179—100.3)

This invention relates to the art and means for optically recording sound and has for its principal object the provision of an improved optical means whereby a single mirror element vibrated in accordance with the impulses to be recorded is utilized to modulate a single light beam which is then passed through a combined light-beam-area-splitter and light-beam-intensity-splitter combined with a symmetrical-prismatic-inverter to produce a plurality of records on a photosensitive surface, and also to furnish visual or audible monitoring if desired.

While the invention will be described as utilized in the recording and reproduction of impulses having frequencies within the audio range, it will be apparent that its use is not restricted to this field only.

An important object of the invention is to provide an improved optical system which is simple in construction and does not require the use of a slit light mask to produce symmetrical, push pull, dual multiple variable areas records of electrical impulses, with both biased or shutter types of noise reduction.

Another object of the invention is to provide an improved means for recording push pull or dual variable density records.

A further object is to provide optical means for recording electrical impulse records on a photosensitive surface without space between the records, while the light modulating means are spaced apart for convenience of operation and adjustment.

Up to the present time many types of optical systems have been used for obtaining symmetrical and multiple electrical impulse records, with or without ground noise reduction. These optical system and methods have suffered from inefficient light transmission or difficulty of adjustment.

The now well known method of employing a triangular spot of light moving across a narrow slit to obtain symmetrical types of records is inefficient in its light transmission, requiring 6 to 80 watt lamps. A 1.4 watt lamp is satisfactory for use with a symmetrical variable area optical system constructed according to my invention, as a cylindrical lens aperture replaces the narrow slit used with the triangular light spot method. Other means of obtaining symmetrical types of records consisting of projecting multiple beams of light onto photosensitive surfaces by light beam area-splitting means only, or by optically combining two or more beams into a single record, have not been practiced because of the difficulty of mechanically adjusting and optically balancing the various parts of the optical systems employed.

In the present invention in its simplest form a single light beam is projected into a light intensity and area beam-splitter prismatic block which transmits two identical but oppositely moving beams to the photosensitive surface, with a cylindrical lens between to image the exposure lamp filament on the photosensitive surface as a fine line varying in length at both of its ends.

It will be evident to those skilled in the art that the prismatic inverter block is useable in making multiple track duplicate prints from original sound tracks, and also in the reproducing optical systems used for push pull and multiple sound track records.

The invention will be better understood from the following description when considered in connection with the accompanying drawings, and its scope will be pointed out in the appended claims.

In the drawings:

Fig. 1 is a diagrammatic illustration of a recording optical system constructed in accordance with the invention, for symmetrical variable area records.

Fig. 2 is a perspective view of one form of an optical device in accordance with my invention, said device functioning as a light-beam-area splitter, a light-beam-intensity splitter, a symmetrical prismatic inverter, and a cylindrical lens.

Fig. 3 illustrates a portion of the optical system shown in Fig. 1, in modified form.

Fig. 4 is a diagram showing a portion of the optical system in Fig. 1 modified for direct positive symmetrical variable area records.

Figs. 5 and 6 are diagrams showing a portion of the optical system in Fig. 1 modified for symmetrical variable area records with shutter noise reduction.

Fig. 7 is a diagrammatic illustration of a twin modulator optical system constructed in accordance with the invention, for direct positive symmetrical variable area records with a, so called, shutter noise reduction.

Fig. 8 shows a portion of a twin modulator optical system with the optical device shown in Fig. 8 being used as a light beam area-splitter only, for push pull or dual variable area or variable density records.

Fig. 9 illustrates an optical system constructed in accordance with the invention, for so called class A push pull symmetrical variable areas records with shutter noise reduction.

Fig. 10 shows a portion of the optical system illustrated in Fig. 9, modified for so called class B push pull symmetrical variable area with automatic self noise reduction in the well known manner.

Fig. 11 illustrates a portion of the recording optical system shown in Figs. 1 and 6 modified for multiple variable area records with bias and shutter noise reduction.

Referring to Figs. 1 and 2, a light source 1 projects a beam of light on vibrator mirror 5 through a lens 2 and a rectangularly shaped aperture 4 in a light stop mask 3. The mirror 5 forms part of a recording galvanometer or audio motor. A rectangular beam of light 7 is reflected from the mirror 5 to a photosensitive surface 12 respectively through a beam splitting symmetrical prismatic inverter block 8 and cylindrical lens 10. Mask 11 is provided to define the outer edges of the record 13. Lens 6 has a focal length such that the edges of the rectangular opening 4 in mask 3 are imaged in the plane of the photosensitive surface 12. When light beam 7 falls on prismatic block 8 the beam is split into two areas. One area having substantially the same light intensity as beam 7 impinges on semi-transparent mirror surface 9 of prismatic inverter block 8, and the other portion of beam 7 continues to viewing screen 14 for visual monitoring, or else it may be discarded.

If desired viewing screen 14 can be replaced with a photoelectric cell and associated equipment to provide audible monitoring. The area of light beam 7 which impinges on semi-transparent mirror surface 9 is split into two beams, each having an area substantially equal to the original but with approximately half the light intensity. These two half-intensity beams are inverted by internal reflection in prismatic inverter block 8 and directed parallel to each other onto photosensitive surface 12, where a symmetrical variable area record 13 is formed by the motion of photosensitive surface 12 past the image of light source 1 formed on the film by cylindrical lens 10. The well known advantages of symmetrical variable area noise reduction records can be obtained by applying bias currents to audio vibrating mirror 5 in the known manner to obtain a small line down the center of record 13 during periods of no modulation, with the record width increasing from both sides of center to accommodate modulation.

Area and intensity light-beam-splitting symmetrical prismatic inverter block 8 illustrated in Fig. 2 is composed of two rightangled triangular prisms 15 and 16 cemented together along one face. This common juncture 9 between the two prism components is varied in transparency in accordance with each specific application. The mirror surface 9 may either reflect approximately half the light impinging on it and transmit the other half, or the mirror surface 9 may be totally reflecting and all the light entering one side 15 of the prismatic inverter block 8 will be directed to one area of the record formed on the photosensitive material while light entering from the other side 16 of the prismatic inverter block 8 will be directed to an adjacent area of the record. If desired cylindrical lens 10 can be formed on the base of prismatic inverter block 8 to eliminate two air to glass surfaces with their consequent reflections and loss of light, or cylindrical lens 10 may be fabricated separately and cemented to the base of prismatic inverter block 8 in which case reflecting surface 9 will extend down only to the base of the prisms 15 and 16 and not into the cylindrical lens 10 shown in Fig. 2.

When using a filament light source 1 of considerable length the reflecting surface 9 of prismatic inverter block 8 may cast a shadow or reflection of graded density down the center of the record. As shown in Fig. 3 mask 17 may be placed in light beam 7 to prevent multiple light reflections off the mirror surface 9, and/or mask 18 as part of mask 11 can be employed to remove any graded density. The only effect is a narrow line down the center of the record, which does not interfere with its use.

Fig. 4 illustrates the optical system used in Fig. 1 but modified to produce so called direct positive symmetrical variable area sound track 21. A light stop 20 is employed to limit the amount of light beam 7 which enters prismatic inverter block 8. A reflecting surface 57 can be used to direct the unused portion of beam 7 to a monitor screen 14. Mask 11 defines the outer edges of the record 21. Noise reduction bias currents can be applied to the audio vibrating mirror 5 for obtaining a symmetrical variable area noise reduction record of the type having a small line running down the center of the record during periods of low modulation.

A symmetrical variable area record with shutter noise reduction 25 or 26 is obtained with an optional system modified as shown in Figs. 5 and 6. Light stop 20 of the optical system of Fig. 4 is replaced by a shutter vane 22 moved by permanent magnet motor assembly 23 as noise reduction currents are applied to terminals 24 in the well known manner. Mirror surface 57 carried by shutter vane 22 directs light to screen 14 for monitoring of both audio and noise reduction modulations.

Fig. 7 shows the optical system illustrated under Fig. 1 with an additional optical system and vibrator mirror 30 to modulate light beam 32 for producing so called direct positive symmetrical variable area records with shutter noise reduction. Lens 31 images rectangular aperture 29 of mask 28 onto photosensitive surface 12. Vibrator mirror 30 is moved by noise reduction currents and forms the shutter noise reduction traces on the record 33. Light stop 20 and mirror surface 57 direct the unused portion of light beam 32 to screen 14a for monitoring of the noise reduction modulations, while screen 14b allows monitoring of the higher frequency electrical impulses. This optical system is of high efficiency for both sides of light source 1 are used to operate the twin optical systems.

By employing a totally reflecting mirror surface 34 as shown in Fig. 8 in conjunction with the two vibrator mirror twin optical system as shown in Fig. 7, dual variable area sound track 37 is obtained. Each half of the track 37 will consist of an independent record A or B, yet both may be biased down to the center of the record for noise reduction purposes if desired. Both tracks can be obtained from a single light source and the vibrating mirror assemblies furnishing beams 35 and 36 can be widely spaced from each other for ease of construction, maintenance and use. The variable area optical systems can be replaced with variable density light-valve type modulators for class A and B push pull variable density records 38, by directing the beams 35 and 36 from the light-valves into prismatic inverter 8 in a manner to fill the entire record 39 with variable density modulated light.

Fig. 9 illustrates a special use of three beam-splitting prismatic inverters in combination to furnish class A push pull variable area records with shutter noise reduction 47. Light from source 1 passes to vibrating mirror 5 through lens 2 and two rectangular apertures 40 and 41 in light stop 39. Lens 6 forms beams 43 and 44 carrying images of apertures 40 and 41 to the photosensitive material 12 respectively through beam intensity splitting prismatic inverters 59 and 60 whose mirror surfaces 9 are semitransparent (approximately 50 percent) and then into prismatic inverter 61 whose mirror surface 34 is completely reflecting, after which the beams are internally reflected in prismatic inverter 61 and directed in substantially parallel paths through cylindrical lens 10 to the photosensitive material 12 with mask 11 defining the outer limits of the record 47. Noise reduction shutters 45 and 46 which move towards and away from each other under the influence of noise reduction currents in the well known manner, intercept light beams 43 and 44 and provide shutter noise reduction traces on the push pull record 47. Vibrating mirror 5 may be mounted to rotate and move beams 43 and 44 through an arc as shown in Fig. 1, etc., or mirror 5 can be mounted on a permanent magnet motor 42 similar to motor 23 of Fig. 5. As mirror 5 moves back and forth in the direction of the small arrows, beams 43 and 44 will move from side to side also, but will not swing through an arc which varies the angles of beams 43 and 44 entering prismatic inverters 59, 60 and 61. In certain optical systems using prismatic inverters this method of moving mirror 5 with motor 42 will be advantageous, and will have small effect on the focal lengths of the optical system.

Fig. 10 illustrates a portion of the optical system shown in Fig. 9 modified to furnish class B push pull variable area records. Light beams 43 and 44 are directed to a light stop 50 by mirror surfaces 48 and 49. When beams 43 and 44 are not moving under the influence of modulation, they do not impinge on beam splitting prismatic inverters 62 and 63 and no light reaches photosensitive surface 12. As light beams 43 and 44 move from side to side during periods of modulation, beam 43 will impinge on prismatic inverter 62 to direct light to photosensitive surface 12 and form one half of an electrical impulse record, and as light beams 43 and 44 move in the other direction beam 44 will impinge on prismatic inverter 63 which will direct light to photosensitive surface 12 and form the other half of an electrical impulse record and in combination furnish class B push pull symmetrical variable area record 51. As is well known, this record 51 is inherently noiseless.

For making multiple variable area symmetrical records a modified form of the optical system shown in Fig. 1 can be employed. As shown in Fig. 11 light beam 7 is first directed into light beam intensity splitter 52 having a semi-transparent reflecting surface 53 through which beam 7 is split into two equal beams 64 and 65 each having approximately half the light intensity of beam 7. These two beams 64 and 65 are directed into prismatic inverters 66 and 67. The unused portion of light beam 65 can be directed to screen 14 for monitoring purposes. Prismatic inverters 66 and 67 have semi-transparent reflecting surfaces 9 which intercept and split a portion of light beams 64 and 65 into two parts each, after which these beams are internally reflected and directed through cylindrical lens 10 to a focus in the plane of photosensitive material 12. A light trap 58 which may be a material made from a mixture of Canada balsam and lampblack serves to absorb the unused portion of light beam 64 and prevent multiple reflections in light beam splitter 52. Vibrating mirror 5 which moves beam 7 may be biased with noise reduction currents for noiseless variable area record 55. To obtain shutter type variable area noise reduction record 56, a shutter 22 (shown in dotted lines) may be introduced in light beam 7 to form shutter traces on the electrical impulse record 56, along optical path 54 (shown in dotted lines).

My invention is not limited to the particular arrangements above described as other optical systems and combinations may be employed to carry out the method of the invention. The drawings are schematically shown and not intended to be to scale.

What I claim is:

1. In a sound recording system, the combination of: means to produce a plurality of intersecting light beams; separate means to laterally oscillate each of said light beams; and light beam intensity splitting means including a semi-reflecting, semi-transmitting surface partially interposed in said beams for recording a plurality of traces on a moving photo-sensitive surface.

2. In a sound recording system, the combination of: means to produce a light beam; means to laterally oscillate said light beam; beam area splitting means including a total reflector partially interposed in said beam to divide the same into two beams of equal intensity; and beam intensity splitting means including a semi-reflecting, semi-transmitting surface interposed in one of said equal intensity beams for recording a plurality of traces on a moving photo-sensitive surface.

3. In a sound recording system, the combination of: means to product a light beam; means to laterally oscillate said light beam; beam area splitting means including a total reflector partially interposed in said beam to divide the same into two beams of equal intensity; beam intensity splitting means including a partially-reflecting, partially-transmitting surface interposed in one of said equal intensity beams for recording a plurality of traces on a moving photo-sensitive surface; and monitoring means positioned in the other of said equal intensity beams whereby to monitor said oscillation.

4. In a sound recording system, the combination of: means to produce a light beam; means to laterally oscillate at least one edge of said beam; and means forming a semi-transparent optical surface partially interposed from an edge into said light beam whereby to divide the latter into an intercepted, and non-intercepted beam of equal intensity and to subdivide said intercepted beam into oppositely moving beams of reduced intensity to record multiple traces on a moving photo-sensitive surface.

5. In a sound recording system, the combination of: means to produce a primary light beam; means to modulate said beam; and a prism interposed in said light beam, said prism having a semi-transparent internal reflecting surface positioned between two intersecting external faces of said prism, said internal surface being adapted to transmit a portion of said beam impinging thereon and to reflect a portion of said beam, said external faces being disposed at substantially equal angles to said semi-transparent surface and said prism being positioned with said semitransparent surface partially interposed in said primary beam whereby a transmitted portion and a reflected portion of said beam are internally reflected from said faces of said prism and emitted from said prism as two substantially parallel beams whereby to record multiple traces on a moving photo-sensitive surface.

6. In a sound recording system, the combination of: means including a mask to produce a primary light beam having a defined lateral edge; means interposed in said primary beam to laterally vibrate the same; stationary means partially interposed in said primary beam whereby to define a motionless edge thereof; and intensity splitting and reflecting means interposed in said beam at a point beyond said first interposed means adapted to divide the same into two secondary beams of reduced intensity and including total reflecting surfaces to direct said secondary beams onto a moving photo-sensitive surface whereby to produce thereon a pair of traces of respective bilateral symmetry, each of said traces having an unmodulated edge, and an edge modulated in accordance with said vibrating means.

7. In a sound recording system, the combination of: means to produce a primary light beam; means interposed in said primary beam to laterally vibrate the same in accordance with the impulses of a signal to be recorded; light blocking means partially interposed in said primary beam whereby to define an edge thereof; electromechanical transducer means to move said partially interposed means in accordance with the integrated intensity of said signal; and intensity splitting and reflecting means including a semi-reflecting surface interposed in said beam adapted to divide the same into two secondary beams of reduced intensity and totally reflecting surfaces to direct said secondary beams onto a moving photo-sensitive surface whereby to produce thereon a pair of traces of respective bilateral symmetry, an edge modulated in accordance with said vibratory means, and an edge modulated in accordance with said partially interposed means.

8. In sound recording apparatus of the class described: means to produce a defined beam of light; movable reflector means interposed in said beam whereby to swing the same in lateral oscillatory motion in accordance with sound impulses; a partially reflecting surface partially interposed in said beam whereby to intercept a portion of the total cross-sectional area of said defined beam, said surface having an edge disposed in said beam and transverse to the direction of said oscillating beam motion whereby the area of said intercepted portion is varied in accordance with said swinging oscillation, said partially reflecting surface being further adapted to transmit and reflect substantially equal intensities of light whereby to split said intercepted beam portion into two further beams oscillating in opposite directions, each of said further beams having at any instant an area equal to the then area of said intercepted beam portion and an intensity equal to substantially one-half thereof; and means to direct said two further beams onto a moving photo-sensitive recording surface whereby said further beams define opposite edges of a double envelope variable area sound track.

9. The construction of claim 8 further characterized in that said last named means includes a pair of totally reflecting surfaces disposed on opposite sides of said partially reflecting surface.

10. The construction of claim 8 further characterized by having a cylindrical lens interposed in said further beams, said cylindrical lens having its axis parallel to the direction of oscillation of said further beams.

11. The construction of claim 8 further characterized by having photo-sensitive monitoring means interposed in the portion of said first defined beam not intercepted by said partially reflecting surfaces.

12. In sound recording apparatus of the class described: means including a light source, at least two lenses, and two masks, to produce two primary light beams; a pair of movable reflectors, one interposed in each of said primary light beams, said reflectors being positioned and adapted to direct said beams to a common intersection; means responsive to electrical impulses to oscillate said reflectors, whereby to move said primary beams transversely in oscillation in accordance with said impulses; an optical element including means forming a partially reflecting surface positioned adjacent said intersection, said surface being disposed and adapted to intercept an edge-adjacent portion of each of said beams whereby said primary beam portions impinge on opposite sides of said partially reflecting surface and the areas of said intercepted portions at any instant depend on the then positions of said oscillating primary beams, said surface being further adapted to reflect and transmit substantially equal intensities of light whereby to split each of said intercepted beam portions into a pair of secondary oscillating beams, each of said secondary oscillating beam pairs being substantially identical in area and intensity, but moving in opposite directions; and reflecting means to direct said beam pairs onto a photo-sensitive surface, moving perpendicularly to said beam motion, whereby to record a pair of variable area sound tracks, each having its opposite edges defined by two of said secondary beams.

13. In photo-phonographic apparatus of the type in which a light beam is oscillated from side to side in accordance with sound impulses, an optical element for splitting said laterally oscillating beam into two oppositely moving laterally oscillating beams to define edges of a variable area sound track which optical element comprises: a reflector having a semi-reflecting, semi-transmitting surface partially interposed from one side into said first oscillating light beam whereby to intercept a lateral portion thereof and to split said intercepted portion into two secondary beams of substantially equal intensity, substantially equal area, and having opposite oscillatory motion; and means forming two substantially totally reflecting surfaces, each interposed in one of said secondary beams, said two reflecting surfaces being further disposed to direct said secondary beams in substantially parallel directions.

14. In sound recording apparatus of the class described, means for producing a pair of oppositely moving, equal intensity, substantially parallel beams comprising: means including a mask to produce a primary light beam having at least one relatively sharply defined lateral edge; a moving beam deflector interposed in said beam to oscillate the same laterally; stationary means having an edge partially interposed in said beam to divide the same laterally into two secondary beams, one of which is defined laterally by said first defined edge and said dividing edge; means forming a partially reflecting surface interposed in said last named secondary beam whereby to split the same into two further beams, one of which is transmitted through said partially reflecting surface, and the other of which is reflected thereby, whereby said further beams diverge; and a pair of reflectors, one interposed in each of said further beams, said reflectors having totally reflecting surfaces disposed at equal angles to said partially reflecting surface whereby to direct said further beams in substantially parallel directions.

15. In sound recording apparatus of the type employing a laterally oscillating primary light beam to record a variable area sound track, an optical element to split said beam into two oppositely moving beams whereby to define opposite edges of a double envelope variable area sound track, said element comprising: a reflector having a semi-reflecting surface partially interposed in said primary beam, said semi-reflecting surface being disposed at an angle of less than ninety degrees to said primary beam whereby to produce two divergent secondary beams, one reflected by, and one transmitted by said semi-reflecting surface; and a pair of reflectors positioned on either side of said semi-reflecting surface, said reflectors having total reflecting surfaces disposed at equal angles to said semi-reflecting surface whereby to direct said secondary beams in substantially parallel directions.

16. The construction of claim 15 further characterized in that said semi-reflecting surface is formed on the interface of two joined prisms.

17. The construction of claim 16 further characterized in that said totally reflecting surfaces are comprised of an outer face in each of said prisms.

WALTER H. BACH.

REFERENCES CITED

The following references are of record in the file of this patent:

UNITED STATES PATENTS

| Number | Name | Date |
|---|---|---|
| 1,497,356 | Comstock | June 10, 1924 |
| 1,497,357 | Comstock | June 10, 1924 |
| 1,722,356 | Roemer | July 30, 1929 |
| 2,031,835 | Kellogg | Feb. 25, 1936 |
| 2,097,758 | Dimmick | Nov. 2, 1937 |
| 2,147,623 | Wender | Feb. 14, 1939 |
| 2,158,874 | Kolb | May 16, 1939 |
| 2,189,932 | Ball | Feb. 13, 1940 |
| 2,189,933 | Ball | Feb. 13, 1940 |
| 2,289,054 | Dimmick | July 7, 1942 |

Certificate of Correction

Patent No. 2,518,743 August 15, 1950

WALTER H. BACH

It is hereby certified that error appears in the printed specification of the above numbered patent requiring correction as follows:

Column 6, line 41, for the word "product" read *produce*; line 61, after "into" insert *two*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*